(12) United States Patent
Nix

(10) Patent No.: US 9,062,896 B2
(45) Date of Patent: Jun. 23, 2015

(54) SYSTEM TO CREATE ROTATIONAL ENERGY FROM A WIND-CHIMMEY AND SOLAR-SMELTER

(71) Applicant: Martin Eugene Nix, Seattle, WA (US)

(72) Inventor: Martin Eugene Nix, Seattle, WA (US)

( * ) Notice: Subject to any disclaimer, the term of this patent is extended or adjusted under 35 U.S.C. 154(b) by 173 days.

(21) Appl. No.: 13/986,595

(22) Filed: May 16, 2013

(65) Prior Publication Data

US 2014/0338658 A1    Nov. 20, 2014

(51) Int. Cl.
*F24J 2/34* (2006.01)
*F24J 2/02* (2006.01)

(52) U.S. Cl.
CPC ... *F24J 2/02* (2013.01); *Y02E 10/40* (2013.01)

(58) Field of Classification Search
CPC .................. F24J 2/02; F24J 2/13; Y02E 10/40
USPC .......... 126/400, 620, 680, 681, 684, 688, 689, 126/690, 692, 696
See application file for complete search history.

(56) References Cited

U.S. PATENT DOCUMENTS

| | | |
|---|---|---|
| 3,979,597 A | 9/1976 | Drucker |
| 4,275,309 A | 6/1981 | Lucier |
| 4,331,042 A | 5/1982 | Anderson |
| 4,335,544 A | 6/1982 | Manson |
| 5,308,187 A | 5/1994 | Nix |
| 6,016,015 A | 1/2000 | Willard |
| 6,089,021 A | 7/2000 | Senanayake |
| 6,428,275 B1 | 8/2002 | Jaakkola |
| 6,590,300 B1 | 7/2003 | Santiago |
| 6,772,593 B2 | 8/2004 | Dunn |
| 7,026,723 B2 | 4/2006 | Moreno |
| 7,344,353 B2 | 3/2008 | Naskali et al. |
| 7,821,151 B2 | 10/2010 | Le et al. |
| 8,344,305 B2 | 1/2013 | Convery |
| 8,360,052 B2 | 1/2013 | Nix |
| 8,534,068 B2 | 9/2013 | Yangpichit |
| 8,552,579 B2 | 10/2013 | Richter |
| 8,776,785 B2 | 7/2014 | Nix .............................. 126/686 |
| 8,776,795 B2 | 7/2014 | Bathe et al. |
| 2006/0016182 A1 | 1/2006 | Comandu et al. |
| 2008/0156315 A1 | 7/2008 | Yangpichit |
| 2010/0283254 A1 | 11/2010 | Richter et al. |
| 2011/0173980 A1 | 7/2011 | Yangpichit |
| 2011/0204648 A1 | 8/2011 | Wilson |
| 2012/0037152 A9* | 2/2012 | Nix .............................. 126/686 |

(Continued)

FOREIGN PATENT DOCUMENTS

| | | |
|---|---|---|
| EP | 2524137 | 4/2002 |
| EP | 1589221 | 10/2005 |
| WO | WO 9427094 | 11/1994 |

(Continued)

OTHER PUBLICATIONS

U.S. Appl. No. 12/459,719, filed Feb. 16, 2002, Nix.

*Primary Examiner* — William Gilbert

(57) ABSTRACT

A rotating-air-compressor moves ambient-air into a solar-smelter, which heats and compresses the ambient-air for a wind-chimney. Located in the wind-chimney is a rotating-helix that captures the ambient-air creating rotational energy. An over-spin-valve controls the velocity of the ambient-air to prevent over spinning of the rotating-helix. A rotating-shaft drives a rotating-machine. Attached to a parabolic-half-shell is a parabolic-overhang protecting a crucible in the solar-smelter from rain and wind.

2 Claims, 5 Drawing Sheets

(56) References Cited

U.S. PATENT DOCUMENTS

2012/0055160 A1    3/2012   Peng
2012/0139249 A1    6/2012   Peng

FOREIGN PATENT DOCUMENTS

WO    WO 2009008763    1/2009
WO    WO2013189504    12/2013

* cited by examiner

SYSTEM TO CREATE ROTATIONAL ENERGY FROM A WIND-CHIMMEY AND SOLAR-SMELTER

FIELD OF INVENTION

A wind-chimney and a solar-smelter create hot, compressed and high velocity ambient-air to drive a rotating-helix, turbine or Archimedes screw.

PRIOR ART

Melting metal with solar energy is a known art and science. The basic principles of a heat engine are a known art and science. The use of wind energy is also a known art and science.

Nix (U.S. Pat. No. 8,360,052, issued Jan. 29, 201) illustrates the use of a parabolic-half-shell, with a planar reflector, rotating in four degrees of freedom. The sun's energy is focused safely towards the ground, towards a stationary focus. The high temperatures created thus are able to smelt metals, glass or cook food.

Nix (U.S. patent application Ser. No. 12/459,719. Filing date Jul. 7, 2009. Pub. No. US 2012/0037152 A9 Feb. 16, 2012) illustrates a parabolic-half-shell with also a curved-overhang. The curved-overhang protects the crucible from snow and rain. The sun's energy is reflected from a planar reflector which is on a turntable, or heliostat. The sun's light is reflected towards the crucible. Stray rays are captured by tiles. Surrounding the crucible is a solar-absorbing-thermal-mass, with embedded-pipe. The embedded-pipe transport hot air, hot water, steam, or a transfer fluid. Thus, heat can be utilized 24 hours a day, 7 days a week. Nix does show a flat reflective curved-overhang attached to the half-shell-parabolic at the 45 degree tangent.

Nix (U.S. Pat. No. 5,308,187, issued May 3, 1994) utilizes a parking lot surface, with a transparent top, to transfer heat to an underground system of pipes. The pipes create hot air for combustion to a fossil fuel burner.

Unlike the invented device, Nix, Nix, and Nix do not show a parabolic-overhang extending beyond the 45 degree tangent to the 65 degree tangent. Nor do Nix, Nix, and Nix show the use of a wind-chimney used in conjunction with a solar-smelter.

Convery (U.S. Pat. No. 8,344,305, issued Jan. 1, 2013) illustrates the technology of heliostats. The invented device utilizes heliostats to make the sun's light horizontal.

Naskali, et. al. (U.S. Pat. No. 7,344,353, issued Mar. 18, 2008) illustrates the manufacture of a helical-wind rotor.

Jaakkola (U.S. Pat. No. 6,428,275, issued Aug. 6, 2002) also illustrates the manufacture of a helical-wind rotor.

Yangpichit (European patent application Ser. No. EP 2524137, Filing date Dec. 13, 2010. Pub. No. EP2524137 A1, Nov. 21, 2012) best illustrates state of the art wind-chimney technology. Vertical axis turbines and an exhaust turbine capture the upward draft of wind. Solar energy, via heat exchangers, is used. An air compressor is used to capture and store energy. Shock absorbers, vanes and flaps are used to control the flow of air.

Bonomi, et. al. (European patent application Ser. No. EP 1589221, Filing date Apr. 14, 2005. Pub. No. EP1589221 A2. Oct. 26, 2005) illustrates state of the art wind-chimney technology. A microprocessor controls the air inlet, so as to keep the electrical generator at a constant speed. Solar heat is used via a greenhouse effect. A plurality of solar collectors is utilized.

Tebuev (European patent application Ser. No. WO 2009008763, Filing date Oct. 23, 2007. Pub. No. WO2009008763 A1. Jan. 15, 2009) uses a noiseless Archimedes screw located inside the wind-chimney that is integrated as part of building structure. A helical turbine is attached to a shaft for rotational energy.

By combining a wind-chimney with solar heat, ambient-air is made hot, compressed and high velocity. A rotating-helix, such as an Archimedes screw or turbine, inserted inside a wind-chimney, thus is able to capture that ambient-air and translate into rotational energy. The technology for utilizing wind energy in a wind-chimney is not new and novel. Nor is the technology for utilization of preheated solar hot air for a wind-chimney. Nor is the technology for controlling the air flow velocity of ambient-air. Capturing the sun's light via solar collectors is not new and novel. By combining both wind and solar energy it creates rotational energy 24 hours a day, 7 days a week, thus is not new and novel.

However, the utilization of a solar-smelter for preheating air to a wind-chimney is new and novel. A solar-smelter creates hotter air, and stores the sun's concentrated energy in melted lava, as inside a crucible. This change-of-phase material thus has greater energy density. Plus, the higher temperatures create greater Carnot efficiency. The higher temperatures, approaching 2,000 degrees F., thus create greater expansion of ambient-air, and thus more velocity. None of the above art discusses the utilization of solar-smelters to manufacture hot, compressed, and high velocity ambient-air for rotational energy. Thus is new and novel.

SUMMARY OF THE INVENTION

A system comprising of a rotating-air-compressor, a over-spin-valve, a solar-smelter, a wind-chimney, a rotating-helix, and a rotating-shaft manufacture rotational energy from concentrated sunlight and from wind energy. The rotational energy thus can power a rotating-machine, such as an electric generator, or a pump, or a compressor.

A rotating-air-compressor, such as a centrifuge fan, compresses and blows ambient-air into the solar-smelter. The solar-smelter utilizes a solar-absorbing-thermal-mass with an embedded crucible. At the embedded crucible is a focus of the parabolic-half-shell. The parabolic-half-shell is reflective on the interior, receiving horizontal sunlight from a heliostat. The heliostat tracks the sun, and makes sunlight horizontal to the reflective interior of the parabolic-half-shell.

The parabolic-half-shell focuses the sun's light unto the crucible. The crucible can make material hot, such as melted glass, or melted metal. The sun's energy is thus stored in the melted materials. The crucible's heat transfers to a solar-absorbing-thermal-mass. The solar-absorbing-thermal-mass is surrounded by an insulating-foundation, and an under-laying-insulation, and is topped by tiles. Thus, heat from the crucible is trapped.

Embedded in the solar-absorbing-thermal-mass are embedded-pipe for the ambient-air. The rotating-air-compressor compresses into the embedded-pipe. The embedded-pipe absorbs heat from the solar-absorbing-thermal-mass, thus making the ambient-air hot. Temperatures on upwards to 2,000 degrees F. can be achieved. It is common knowledge that when air is heated, it expands. Thus, the expanding air creates pressure and velocity.

Unique is a parabolic-overhang. Attached to the parabolic-half-shell, at the 45 degree tangent, the parabolic-overhang helps to protect the crucible from rain and snow. It is also angled so as to concentrate more sunlight downwards from the horizontal light created by the heliostat. This addition of a parabolic-overhang adds additional concentrated sunlight to the crucible, making the crucible hotter. Thus, more heat is transferred to the solar-absorbing-thermal-mass, and thus more heat is transferred to the embedded-pipe, and thus more heat is added to the ambient-air.

The heated ambient-air from the solar-absorbing-thermal-mass goes into a wind-chimney. A wind-chimney creates a vacuum from the movement of wind. When wind strikes the top of the wind-chimney, the wind moves upwards, thus creating a vacuum. This vacuum then draws the heated ambient-air from the solar-absorbing-thermal-mass upwards, creating velocity.

In the cavity of the wind-chimney is a rotating-helix. This rotating-helix is much like an Archimedes screw. As the heated ambient-air moves upwards, it strikes the blades of the rotating-helix, thus causing the rotating-helix to rotate. This rotational energy is transferred to a rotating-shaft. The rotating-shaft is attached to a rotating-machine, such as an electric generator, pump, or air compressor. The rotating-shaft is also attached to the rotating-air-compressor. As the ambient-air gets hotter, and as the wind blows stronger, the rotating-shaft rotates faster. Thus the rotating-air-compressor compresses more ambient-air. The net result is the use of solar and wind energy to create rotational energy.

In the event of a storm, when wind may cause the rotating-helix to over rotate, or in the event, the crucible overheats the ambient-air, an over-spin-valve can close. This constricts the amount of ambient-air entering the solar-absorbing-thermal-mass and also the wind-chimney. Thus, the over-spin-valve prevents the rotating-helix from over spinning.

The combination of both wind and solar energy is advantageous. Often times wind energy is available when solar energy isn't. Often times solar energy is available when wind energy isn't. Wind energy is often available in winter. Solar energy is often available in the summer. Wind energy is often available at night. Solar energy is often available in the day. By combining wind and solar energy it helps to keep the shaft rotating 24 hours a day, 7 days a week, year round.

DETAILED DESCRIPTION

Figure 1:
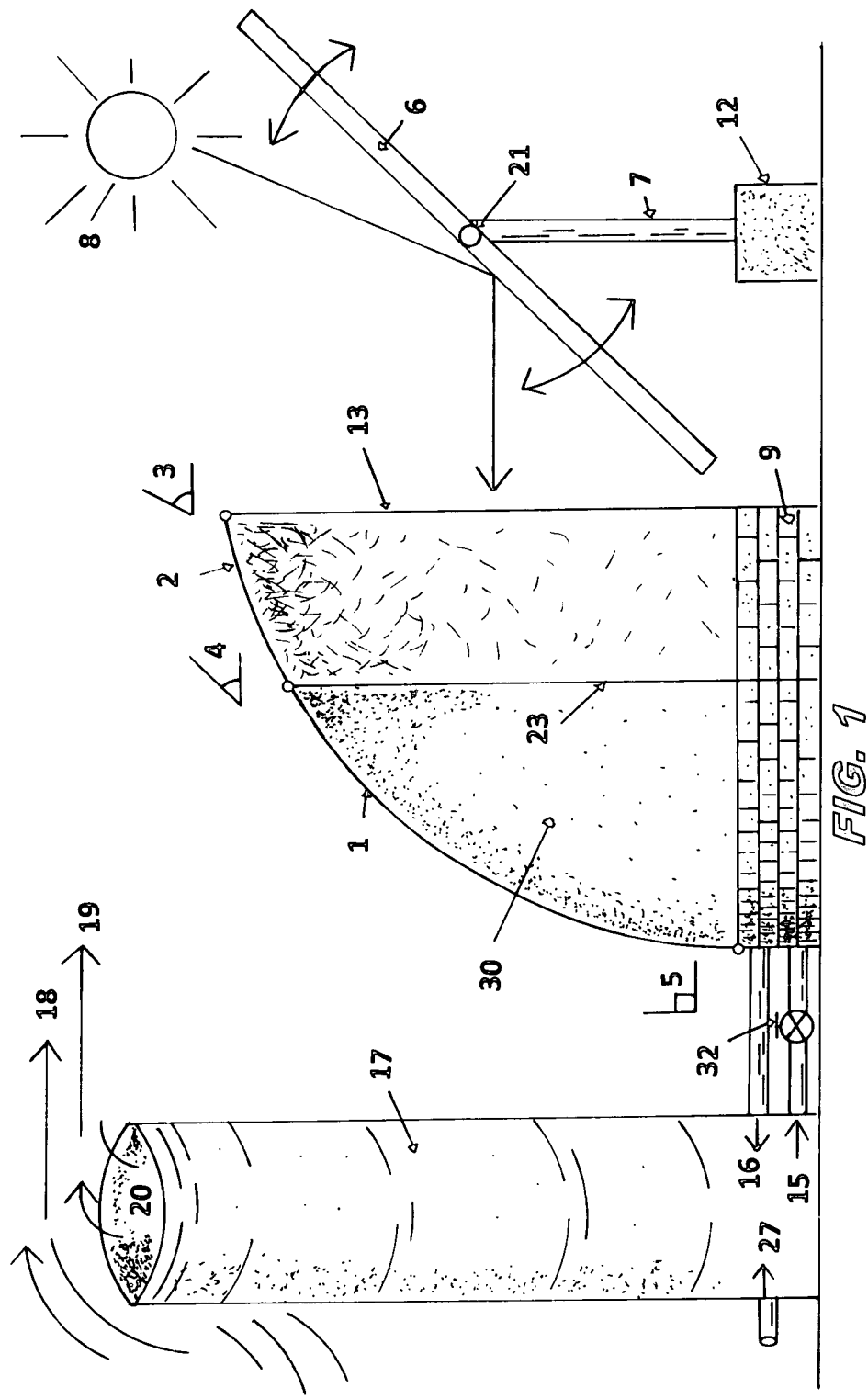
FIG. 1 illustrates an exterior side view of the invented device.

FIG. 1 illustrates an exterior side view of the invented device. Shown is a moving heliostat (6) mounted on a post (7) that redirects the sun's light (8) horizontal into the open-void (13) created by the interior walls of the parabolic-half-shell (1), and the parabolic-overhang (2). The heliostat (6) moves in four degrees of freedom. Servo-motors (21) track the heliostat (6). A base (12) holds the heliostat's post (7) stable. The parabolic-half-shell (1) and parabolic-overhang (2) are mounted to an insulating-foundation (9). Ambient-air (27) enters the wind-chimney (17) and is compressed (15) and then blown into the solar-smelter (30). The solar-smelter (30) then heats the ambient-air (16), so that it is compressed and high velocity. The heated ambient-air (16) then travels upwards the wind-chimney (17). Shown also is the over-spin-valve (32). The heated and compressed ambient-air (19) exits the wind-chimney (17). The ambient-air (19) is pulled by a vacuum (20), created by the moving wind (18).

Shown also is the parabolic-half-shell (1) and parabolic-overhang (2). The parabolic-half-shell (1) extends from the zero degree tangent (5), to the 45 degree tangent (4). Attached to the half-circle (23) formed by the 45 degree tangent (4) is the parabolic-overhang (2). The parabolic-overhang (2) extends from the 45 degree tangent (4) to the 65 degree tangent (3).

Figure 2:
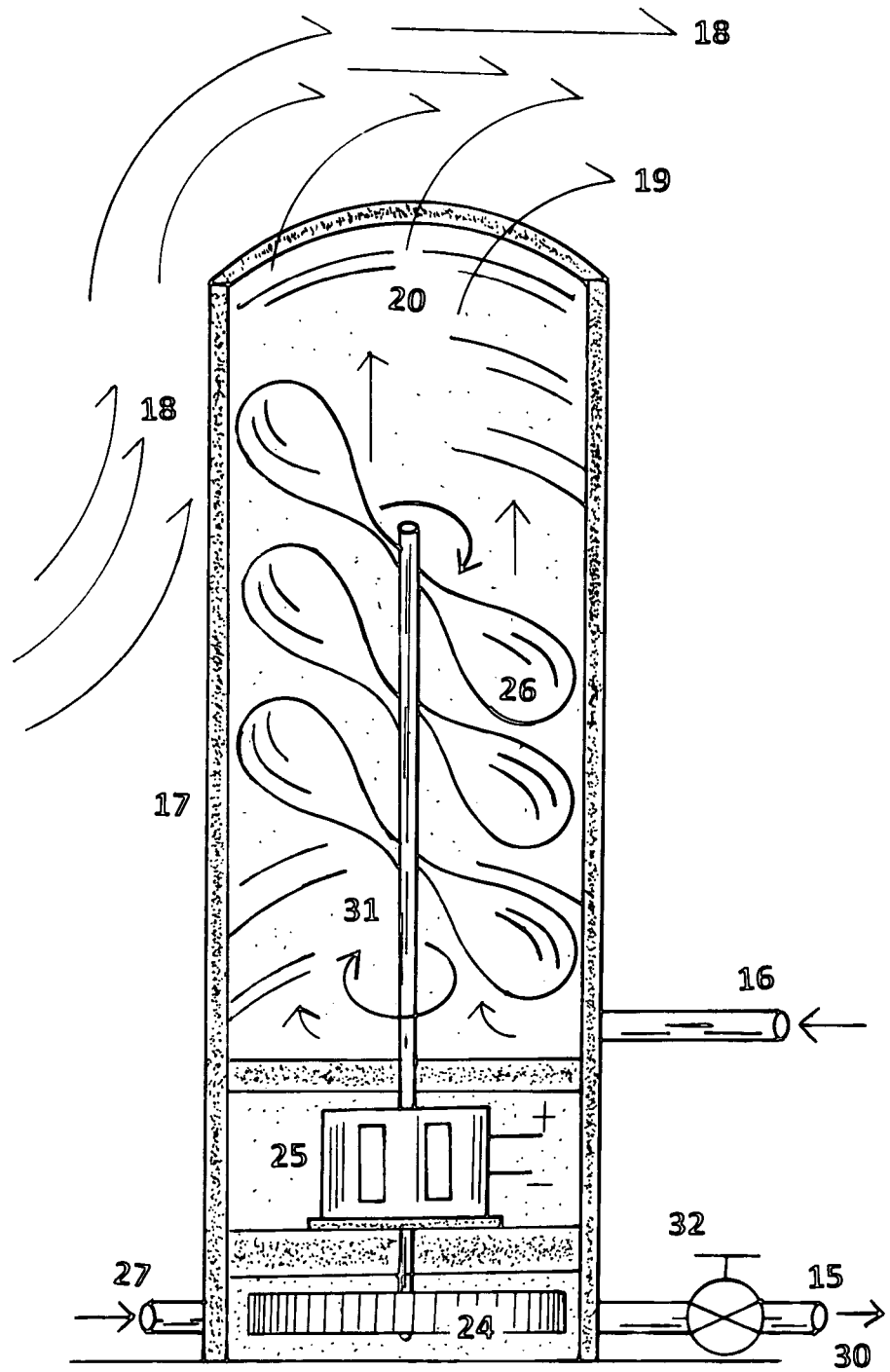
FIG. 2 illustrates the interior functional side view of the wind-chimney.

FIG. 2 illustrates the interior functional side view of the wind-chimney (17). Exterior ambient-air (27) enters the rotating-air-compressor (24) which in turn compresses the ambient-air (27). Then ambient-air (15) exits the rotating-air-compressor (24) to the solar-smelter (30). The solar-smelter (30) then heats the ambient-air (15) and enters the wind-chimney (17). The heated ambient-air (16) then travels upwards turning a helix-coil (26) transferring the energy (16) to a rotating-shaft (31). The rotating-shaft (31) in turn rotates a rotating-machine (25), such as an electric generator, a pump, or compressor. The rotating-shaft (31) also turns the rotating-air-compressor (24). The ambient-air (19) exits the wind-chimney (17) and is pulled by the vacuum (20) created by the moving wind (18). The wind-chimney (17) can be insulated. When there is a storm, an over-spin-valve (32) can be closed so as to prevent the rotating-helix (26) from over spinning.

Figure 3:
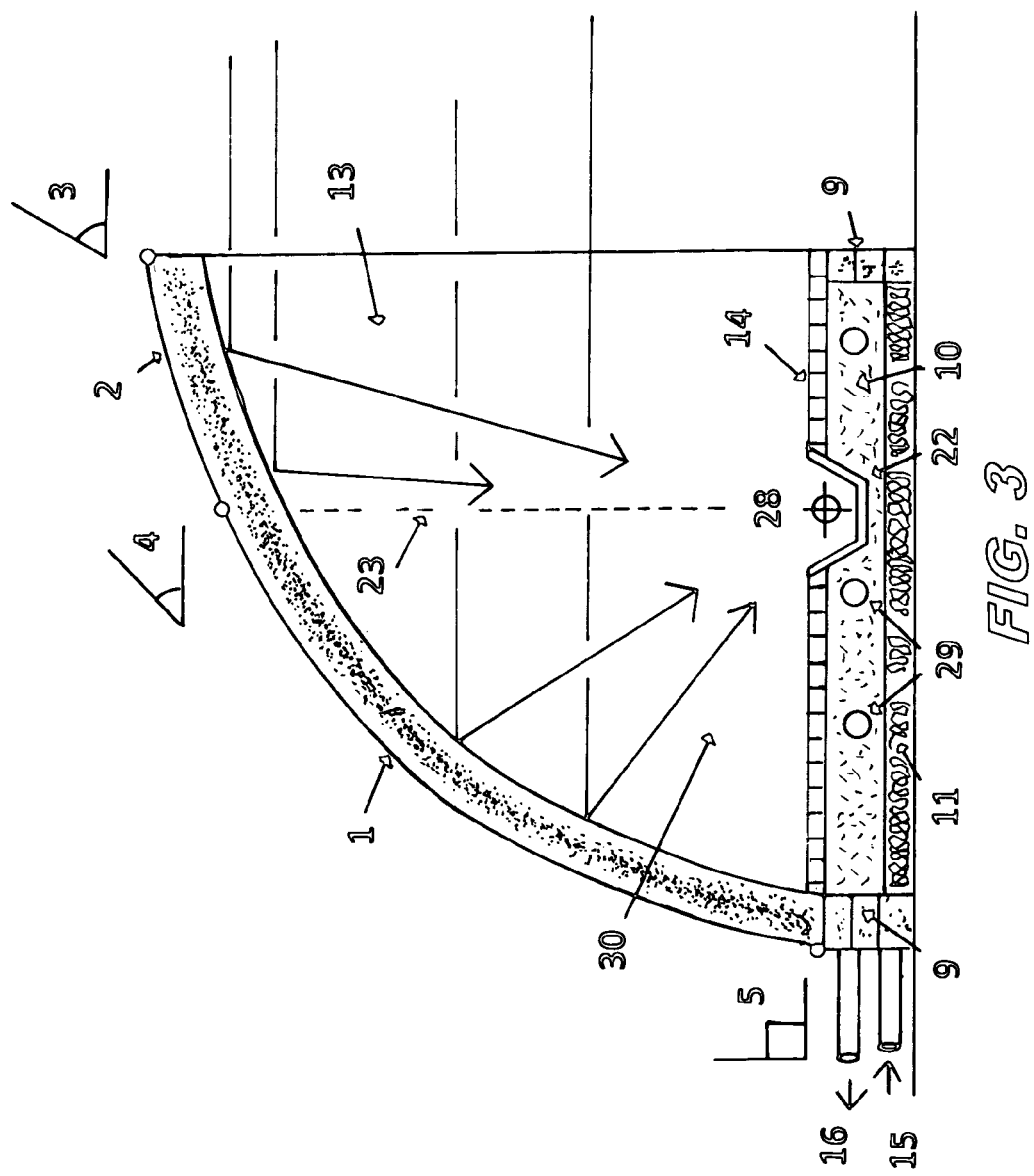
FIG. 3 illustrates the interior functional side view of the solar-smelter.

FIG. 3 illustrates the interior functional side view of the solar-smelter (30). Shown by straight arrows is the horizontal sunlight entering the open-void (13) created by the reflective interior of the half-shell-parabolic (1) and the parabolic-overhang (2). The sun's light is redirected to the focus (28), where a crucible (22) is located. The concentrated sunlight then melts materials like glass, metal or rock. The stored heat of the crucible (22) heats an interior solar-absorbing-thermal-mass (10) which has embedded-pipe (29). The heat transfers to the ambient-air (15,16), making the ambient-air (15,16) hot and compressed. The ambient-air (16) is made high velocity. The solar-absorbing-thermal-mass (10) is bounded by an underlaying-insulation (11) and by the insulating-foundation (9), and topped by tile (14). The net result is heat is stored for use 24 hours a day, 7 days a week.

Shown also is the parabolic-half-shell (1), which extends from the zero degree tangent (5) to the 45 degree tangent (4). Attached to the half-circle (23) formed by the 45 degree tangent (4) is a parabolic-overhang (2). The parabolic-overhang (2) extends from the 45 degree tangent (4) to the 65 degree tangent (3).

Figure 4:
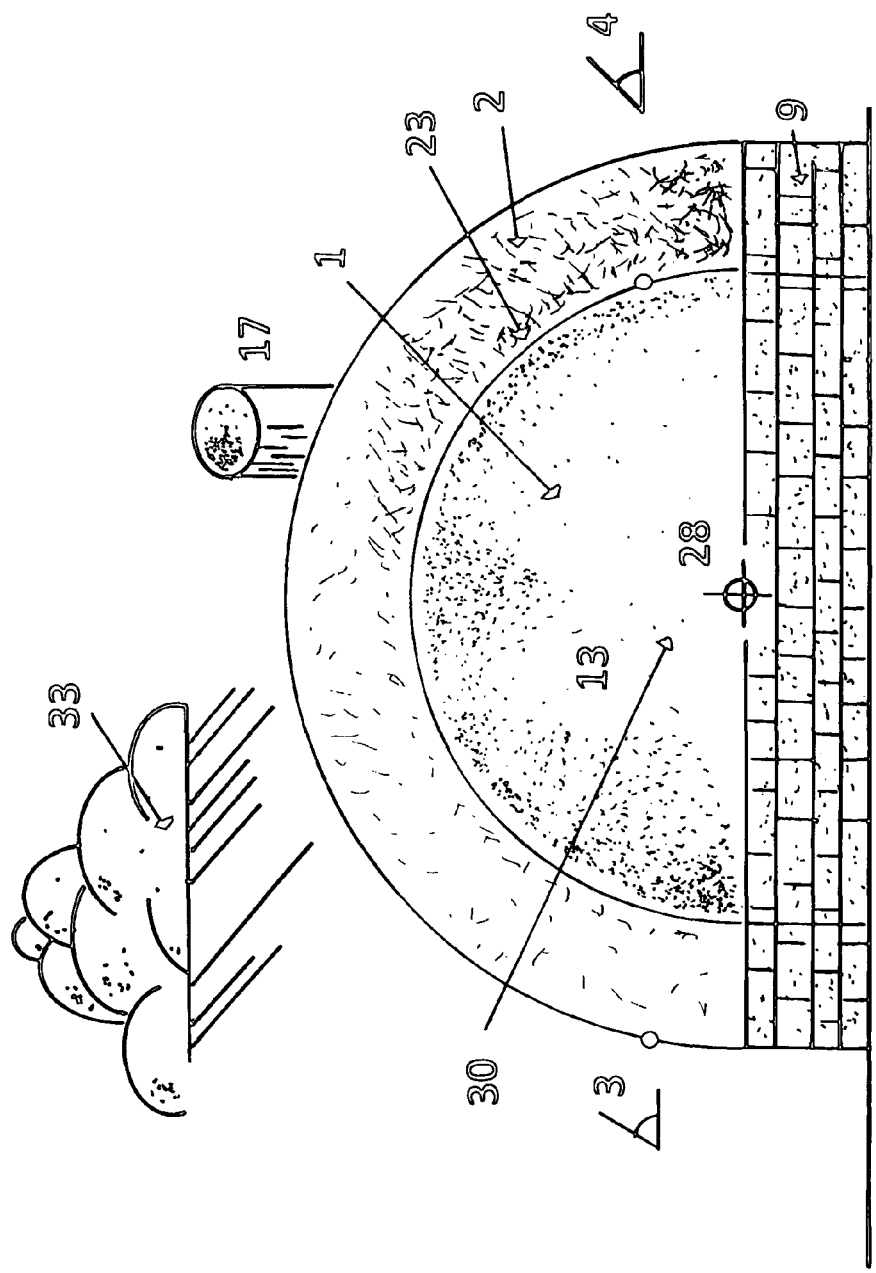
FIG. 4 is an exterior frontal view of the solar-smelter.

FIG. 4 is an exterior frontal view of the solar-smelter (30). Shown is an insulating-foundation (9) which is mounting for the parabolic-half-shell (1) and the parabolic-overhang (2). Shown also is the focus (28) formed by the parabolic-half-shell (1) and parabolic-overhang (2). An open-void (13) is shown. The parabolic-overhang (2) protects the focus (28) from rain and snow (33). Shown is the half-circle (23) formed by the 45 degree tangent (4). The 65 degree tangent (3) is shown. Also shown is the wind-chimney (17).

Figure 5:
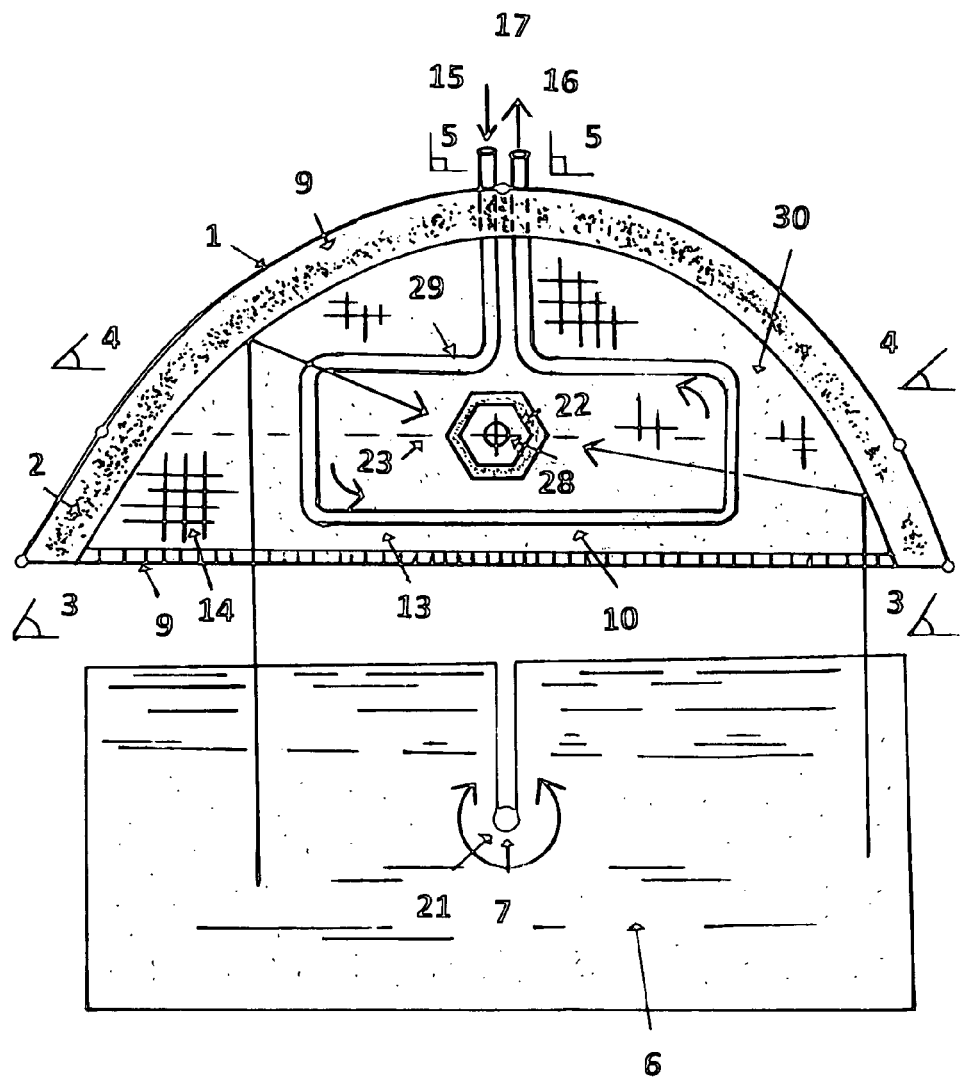
FIG. 5 Shown is a functional overhead view of the solar-smelter and heliostat.

FIG. 5 Shown is a functional overhead view of the solar-smelter (30) and heliostat (6). The heliostat (6) is supported by a post (7) with a servo-motor (21) rotating the heliostat (6) so that it makes sunlight horizontal, as shown by the straight arrows. The horizontal sunlight enters the open-void (13) created by the reflective interior of the parabolic-half-shell (1) and the parabolic-overhang (2). The horizontal sunlight is redirected to the focus (28) and the crucible (22) by the reflection from the parabolic-half-shell (1) and parabolic-overhang (2). The crucible (22) is made hot by the concentrated sunlight. The crucible (22) transfers heat to the solar-absorbing-thermal-mass (10) which is bounded by the insulating-foundation (9). The solar-absorbing-thermal-mass (10) is topped by tiles (14). In the interior of the solar-absorbing-thermal-mass (10) are embedded-pipe (29), which make ambient-air (15,16) hot. The ambient-air (15) enters the solar-absorbing-thermal-mass (10) from the wind-chimney (17) and exits the solar-absorbing-thermal-mass (10) to the wind-chimney (17). Also shown is the 45 degree tangent (4), the 65 degree tangent (3), and the zero degree tangent (5). The half-circle (23) formed by the 45 degree tangent (4) is shown by the dotted line.

The invention claimed is:

1. A parabolic-overhang;
   said parabolic-overhang extending from a 45 degree tangent to a 65 degree tangent;
   the parabolic-overhang attached and adjacent to a parabolic-half-shell;
   said 45 degree tangent formed by an extension of said parabolic-half-shell from a zero degree tangent; said 65 degree tangent formed by an extension of the parabolic-half-shell from said zero degree tangent; the parabolic-overhang attached and adjacent to the parabolic-half-shell at the 45 degree tangent; the parabolic-overhang attached and adjacent to a half-circle formed by the 45 degree tangent; the parabolic-overhang positioned perpendicular and attached to an insulating-foundation; the parabolic-overhang having an inner surface capable of reflecting sunlight; the parabolic-overhang being angled so as to concentrate more sunlight in a downward direction from a horizontal light created by a heliostat; the parabolic-overhang located centrally and overhead a crucible and a solar absorbing thermal mass; the parabolic-overhang being configured to aid in providing additional sunlight to the crucible, thereby increasing the crucible temperature; the parabolic-overhang adding additional sunlight to the solar-absorbing-thermal-mass; the parabolic-overhang capable of protecting the crucible and the solar-absorbing-thermal-mass from rain and snow.

2. A system for manufacturing rotational energy;
   said system utilizing a solar smelter;
   said solar smelter comprised of a solar-absorbing-thermal-mass with an embedded-pipe, an embedded crucible, an insulating-foundation, an under-lying-insulation, a plurality of tiles, a parabolic-overhang and a parabolic-half-shell with a heliostat; the solar smelter capable of manufacturing hot, compressed and high velocity ambient-air for a wind-chimney; said wind-chimney containing a helix-coil; said helix-coil having a rotating shaft located therein; the wind-chimney creating a vacuum for said hot, compressed and high velocity ambient-air; said helix-coil utilizing the hot, compressed and high velocity ambient-air to create rotational energy for said rotating-shaft; said rotating-shaft connected to and rotating a rotating-machine; the hot, compressed and high velocity ambient-air creating rotational energy for said rotating-machine by rotating said rotating shaft; the rotating-shaft creating rotational energy for a rotating-air-compressor configured to blow air into the smelter; an over-spin-valve connected to the smelter and configured to regulate the velocity of the hot, compressed and high velocity ambient-air; said over-spin-valve configured to prevent the helix-coil from over spinning;
   the system creating rotational energy via the rotating-shaft for said rotating air-compressor and for the rotating-machine.

\* \* \* \* \*